United States Patent (10) Patent No.: US 8,327,414 B2
Strassner et al. (45) Date of Patent: Dec. 4, 2012

(54) PERFORMING POLICY CONFLICT DETECTION AND RESOLUTION USING SEMANTIC ANALYSIS

(75) Inventors: John C. Strassner, North Barrington, IL (US); Gregory W. Cox, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1356 days.

(21) Appl. No.: 11/766,212

(22) Filed: Jun. 21, 2007

(65) Prior Publication Data
US 2008/0320550 A1 Dec. 25, 2008

(51) Int. Cl.
*G06F 17/00* (2006.01)
*H04L 29/06* (2006.01)

(52) U.S. Cl. .................... 726/1; 726/6; 704/1; 718/104; 706/47

(58) Field of Classification Search ................ 726/1, 14; 709/224
See application file for complete search history.

(56) References Cited

U.S. PATENT DOCUMENTS

| 6,910,028 | B2 * | 6/2005 | Chan et al. ................. 706/47 |
| 7,027,408 | B2 * | 4/2006 | Nabkel et al. ............... 370/252 |
| 7,478,419 | B2 * | 1/2009 | Anderson et al. ............ 726/1 |
| 7,542,956 | B2 * | 6/2009 | Strassner et al. ............ 706/46 |
| 7,904,909 | B1 * | 3/2011 | Reiner et al. ................ 718/104 |
| 8,019,770 | B1 * | 9/2011 | Hartsook et al. ............. 707/759 |
| 2003/0023573 | A1 * | 1/2003 | Chan et al. ................. 706/47 |
| 2004/0193952 | A1 | 9/2004 | Narayanan et al. |
| 2004/0254809 | A1 * | 12/2004 | Teicher ....................... 705/1 |
| 2005/0276262 | A1 * | 12/2005 | Schuba et al. ............... 370/389 |
| 2006/0010439 | A1 | 1/2006 | Majidian |
| 2006/0041421 | A1 | 2/2006 | Ta et al. |
| 2006/0069717 | A1 * | 3/2006 | Mamou et al. ............... 709/203 |
| 2006/0184616 | A1 * | 8/2006 | Park et al. ................... 709/203 |
| 2006/0206440 | A1 | 9/2006 | Anderson et al. |

(Continued)

FOREIGN PATENT DOCUMENTS
WO 2004066128 A2 8/2004

OTHER PUBLICATIONS

Felix J Garcia, Towards Semantic Web-based management of security services, SpringerLink—Telecomm, vol. 63, pp. 185-190.*

(Continued)

*Primary Examiner* — Nathan Flynn
*Assistant Examiner* — Viral Lakhia
(74) *Attorney, Agent, or Firm* — Randi L. Karpinia; Kenneth A. Haas

(57) ABSTRACT

A method and system for managing a policy includes, in response to determining the presence of a conflict, determining a semantic equivalence between a component of a policy rule and at least one additional policy rule. The determining a semantic equivalence is performed by using a semantic reasoning algorithm that includes the steps of determining a first policy target of a first policy rule and a second policy target of a second policy rule, determining a meaning of the first policy target and a meaning of the second policy rule, assigning a confidence value based on the determined meaning of the first policy, assigning a confidence value based on the determined meaning of the second policy, performing a semantic comparison between the first policy target and the second policy target, and determining, based at least in part on the semantic comparison, the presence of a conflict between the first and second policy targets.

16 Claims, 12 Drawing Sheets

U.S. PATENT DOCUMENTS

| | | | |
|---|---|---|---|
| 2008/0126287 A1* | 5/2008 | Cox et al. | 706/48 |
| 2008/0162109 A1* | 7/2008 | Strassner et al. | 704/1 |
| 2008/0271111 A1* | 10/2008 | Cox et al. | 726/1 |
| 2009/0138960 A1* | 5/2009 | Felty et al. | 726/14 |
| 2009/0172776 A1* | 7/2009 | Makagon et al. | 726/2 |
| 2010/0262809 A1* | 10/2010 | Mccolgan et al. | 712/216 |

OTHER PUBLICATIONS

Commissioner, "PCT International Search Report and Written Opinion," WIPO, ISA/KR, Oct. 30, 2008.

International Preliminary Report on Patentability for International Application No. PCT/US2008/066416 mailed on Jan. 7, 2010.

Damianou, N., "A Policy Framework for Management of Distributed Systems," Ph.D. Thesis, Feb. 2002.

E. Lupu, "A Role-Based Framework for Distributed Systems Management," Ph.D. Thesis, Jul. 1998.

Fu, Z., et al., "Ipsec/VPN Security Policy: Correctness, Conflict Detection and Resolution," Policy 2001 Conference, Jan. 2001.

Gruber, T., "A Translation Approach to Portable Ontology Specification", Knowledge Acquisition 5(2), 1993, pp. 199-220.

Gruber T., "What is an Ontology," Accessed at http://www-ksl.stanford.edu/kst/what-is-an-ontology.html accessed on May 31, 2012.

Guarino, N., "Formal Ontology in Information Systems," First International Conference on Formal Ontology in Information Systems, N. Guarino (ed.), Trento, Italy.

Dunlop, N., et al., "Dynamic Conflict Detection in Policy-Based Management Systems," Policy 2002 Conference, Jun. 2002.

Neches, R., et al., "Enabling technology for knowledge sharing", AI Magazine 12(3) 1991, pp. 36-56.

Studer, R., et al., "Knowledge Engineering: Principles and Methods," IEEE Transactions on Data and Knowledge Engineering 25(1-2):161-197.

Tonti, G., et al., "Semantic Web Languages for Policy Representation and Reasoning: A Comparison of KAoS, Rei, and Ponder," Proceedings of the 2nd International Semantic Web Conference (ISWC2003) http://ontology.ihmc.us:16080/papers.html.

Wong, A., et al., "Ontology Mapping for the Interoperability Problem in Network Management," IEEE Journal on Selected Areas in Communications, vol. 23, No. 10, Oct. 2005.

* cited by examiner

PERFORMING POLICY CONFLICT DETECTION AND RESOLUTION USING SEMANTIC ANALYSIS

FIELD OF THE INVENTION

This invention relates in general to the fields of policy management, network management, and self-management (i.e., autonomic computing systems), and more specifically to the sub-field of policy conflict detection and resolution.

BACKGROUND OF THE INVENTION

Conflict detection and resolution is a complex topic. There are a host of references on conflict detection. FIG. 1 shows a representative and comprehensive Policy Based Network Management (PBNM) system known in the art. This architecture explicitly identifies five different levels of conflict detection and resolution: globally between policy servers, globally across the different components of a particular policy server, locally for all Policy Decision Points (PDPs) in a domain of a policy server, local to a particular PDP within a specific domain of a given policy server, and local per device (i.e., a PEP) in a domain.

The architecture shown in FIG. 1 is based on the following definition of a policy conflict:

A policy conflict occurs when the conditions of two or more policy rules that apply to the same set of managed objects are simultaneously satisfied, but the actions of two or more of these policy rules conflict with each other.

A simplified model of a policy rule is a triplet, consisting of three clauses: event, condition, and action. Events are used to trigger the evaluation of a policy rule; conditions specify if the policy rule is applicable, and actions define what to do. Therefore, there are three main types of conflicts that can occur in a PBNM system. The conflicts include conflicts between different policy rules; conflicts between the actions within a policy rule; and conflicts between policy rules within a policy rule (e.g., sub-rules within a rule).

Unfortunately, this architecture does not address semantic conflicts. Semantics are neither considered in the definition of a policy conflict, nor in the definition of a policy rule. This is true of all other policy rule definitions in the existing art.

There are mechanisms known in the art to detect policy conflicts. However, these mechanisms fail to detect all of the above-mentioned types of policy conflicts. For example, two policies could pass all tests for conflicts and still have semantic conflicts (e.g., two policies that, when instantiated, have conflicting side effects, or conflicting directives based on different meanings).

Therefore, a need exists to overcome the problems with the prior art as discussed above.

SUMMARY OF THE INVENTION

A method and system are disclosed for managing a policy, where the method includes determining a presence of a conflict and in response to determining the presence of a conflict, determining a semantic equivalence between a component of a policy rule and at least one additional policy rule.

In accordance with an added feature of the invention, the determining a semantic equivalence is performed by using a semantic reasoning algorithm.

In accordance with an additional feature of the invention, the semantic reasoning algorithm further includes determining a first policy target of a first policy rule and a second policy target of a second policy rule, determining a meaning of the first policy target and a meaning of the second policy rule, assigning a confidence value based on the determining the meaning of the first policy, assigning a confidence value based on the determining the meaning of the second policy, performing a semantic comparison between the first policy target and the second policy target, and determining, based at least in part on the semantic comparison, the presence of a conflict between the first policy target and the second policy target.

In accordance with an additional feature, the present invention further includes determining whether a policy rule has a corresponding set of at least one policy event, at least one policy condition, and at least one policy action, and then creating an error message if the policy rule does not have a corresponding set of at least one policy event, at least one policy condition, and at least one policy action.

In accordance with an additional feature of the invention, the step of determining whether a policy rule has a corresponding set of at least one policy event, at least one policy condition, and at least one policy action includes determining the presence of one or more mandatory fields and then creating an error message if the one or more mandatory fields are not present.

In accordance with an additional feature, the present invention includes determining the presence of at least one unknown data structure in the set of at least one policy event, at least one policy condition, and at least one policy action of a policy rule and, in response, creating an error message if an unknown structure is present.

In accordance with yet another feature, the present invention includes determining a presence of at least two continuum levels, determining a mismatch of the at least two continuum levels, and creating an error message.

In accordance with yet a further feature, a method and system are disclosed for managing a policy, where the method includes using one or more of an information model, a data model, and an ontology to associate semantics from one or more different sources to one or more policies in a set of policies, establish a relationship of semantic equivalence between the policies in the set of policies, and determine a degree of conflict between the policies by using the relationship of semantic equivalence in a semantic equivalence algorithm.

In accordance with still a further feature, the present invention includes estimating, based on the degree of conflict which has been determined, a probability of two or more of the policies conflicting with each other.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The present invention solves the limitations defined in the prior-art by using a combination of information and data models, ontologies, and machine-based reasoning mechanisms to (1) associate semantics from one or more different sources to each policy, (2) establish a lattice of semantic equivalence between different policies, and (3) determine the degree of conflict between policies by using a semantic equivalence algorithm. Significantly, the degree of conflict provides a probabilistic estimation of whether two or more policies will, in fact, conflict.

Figure 1:
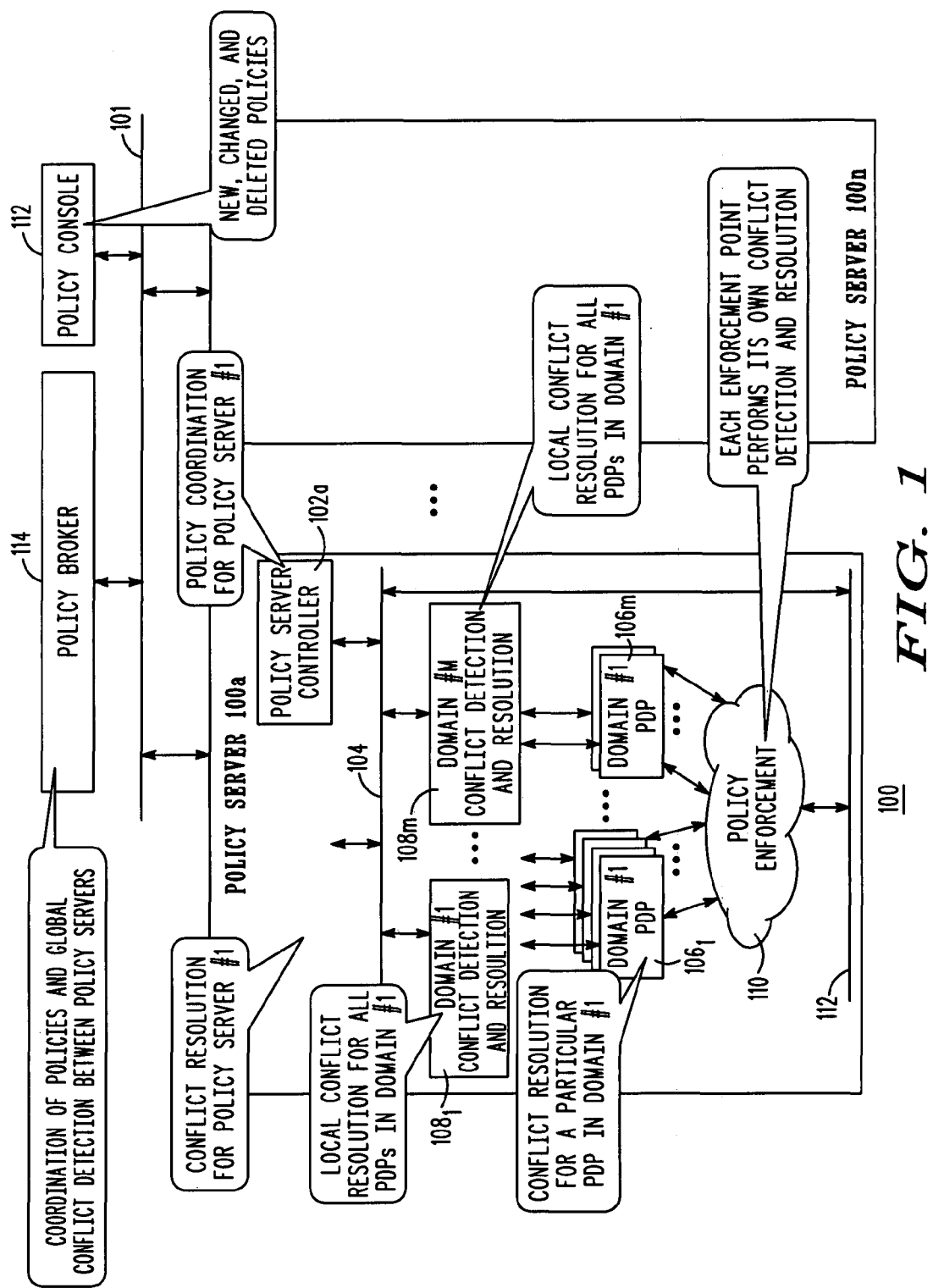
FIG. 1 representative diagram of a Policy-Based Network Management (PBNM) system known in the art.

FIG. 1 illustrates a simple policy-based system 100, according to an embodiment, that is useful for implementing the present invention. In FIG. 1, policy servers 100a-n actively manage the policy rules governing operation of the system. A policy system bus 101 connects the policy system components. In this example case, each policy server 100a-n is separate and communicates via the policy system bus 101.

Each policy server 100a-n includes several components for performing conflict resolution at different abstractions within that server. A policy conflict occurs when the conditions of two or more policy rules that apply to the same set of managed objects are simultaneously satisfied, but the actions of two or more of these policy rules conflict with each other. Each policy server 100a-n has its own policy server controller 102a-n, which coordinates policies in its respective policy server. The policy server controller 102 has a set of domains $108_{1-M}$, which are in communication with the policy server controller via a server bus 104. Each domain $108_{1-M}$ is coupled to a policy decision capability, which may be represented by a single or set of policy decision points (PDP) $106_1$-$106_M$. The PDPs $106_1$-$106_M$ evaluate policy conditions that are targeted at specific domains, such as QoS and security. Hence, the function of the policy controller is to ensure that policy decisions between domains that it governs do not conflict with each other. This addresses the most common existing and legacy deployments of policy management, wherein separate policy control is assigned to different functions to be managed. However, this should not limit the present invention.

Policy Decision Points (PDPs) $106_1$-$106_M$ communicate with a set of devices, one or more of which enforce the policies provided by the PDPs. This is collectively denoted as the Policy Enforcement Point (PEP) 110. Each PEP 110 performs its own conflict detection and resolution. The PEP 110 is able to communicate directly with the server bus 104 via a second server bus 112.

The above case illustrates one or more PDPs in one or more domains affecting the same PEP, and is the most straightforward case of policy conflict. However, it is also possible for the one or more PDPs in one or more domains to affect different PEPs that are related to each other. For example, consider two network devices A and B that are supposed to communicate with each other. Assume that policy rules are used to determine if that communication is to be allowed or not. A conflict will occur if one policy rule allows device A to communicate with device B, but the other policy rule does not allow device B to communicate with device A.

The PEP thus receives policy rules from one or more PDPs from one or more domains. However, the PEP may not be able to execute these policy rules. For example, the policy rules may be in a language that the PEP does not understand.

Reviewing the different types of conflict detection that FIG. 1 illustrates within a domain that this invention detects, there are:

a) a conflict within a PEP (e.g., a new policy rule takes different actions than existing policy rules that have already been executed by that PEP)

b) a conflict among PEPs (e.g., two or more PEPs that need to collaborate are given policies that do not enable that collaboration)

c) a conflict in a particular PDP in a given domain (e.g., a new policy rule takes different actions than existing policy rules that have already been deployed to one or more devices being managed by that particular PDP)

d) a conflict among two or more PDPs in a given domain (e.g., a new policy rule takes different actions than existing policy rules that have already been deployed to one or more devices being managed by one or more PDPs)

e) a conflict among two or more PDPs in two or more domains (note that this can only be performed by the policy controller, since the PDPs in one domain do not know what actions PDPs in another domain are taking)

The policy-based system 100, in accordance with one embodiment of the present invention, also includes a policy broker 114. The policy broker 114 controls how different policy servers 100 interact with each other and ensures that conflicts do not exist between the policy servers 100. The policy broker 114 also coordinates the application of different policy rules in different policy servers 100.

The policy-based system 100, in accordance with one embodiment of the present invention, further includes a policy console 112. This component is used by policy authors and editors to create, update, store, delete, manage, and deploy policy rules in the system.

Figure 2:
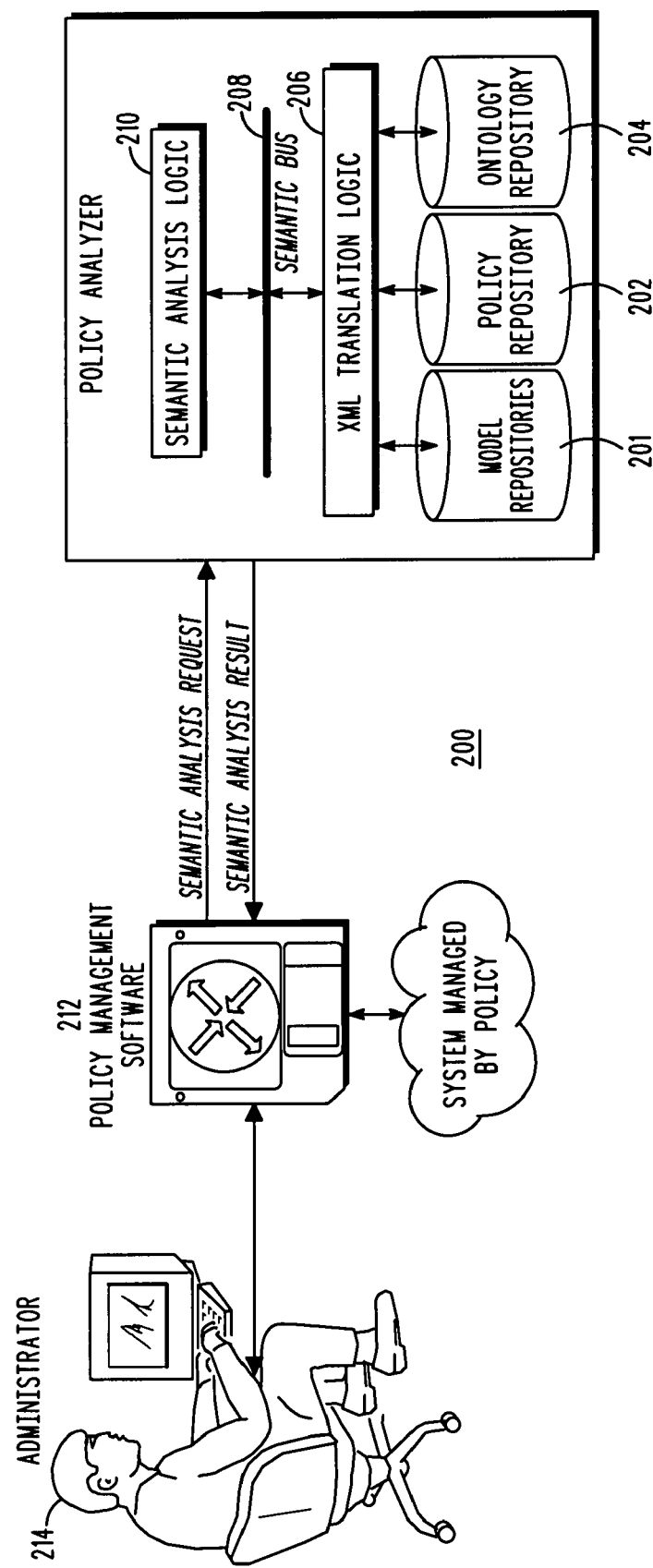
FIG. 2 is a representative diagram of a system for performing policy conflict detection and resolution using semantic analysis, according to an embodiment of the present invention.

FIG. 2 shows a conceptual architecture of the present invention. The simplicity of FIG. 2 is advantageous. The intent of the present invention is to not disturb existing legacy implementations. Rather, the invention is conceptually an "add-on" feature that can be invoked using a simple Application Programming Interface (API), and provides an indication of which Policies are in semantic conflict using an equally simple API. The present invention can be used for Policies that are being input to the Policy Management Software (whether by GUI or script-based interface) as well as to check policies that have already been stored in the Policy Repository.

The Policy Analyzer 200 of FIG. 2 includes six important entities: the Model Repository 201, the Policy Repository 202, the Ontology Repository 204, the XML Translation Logic 206, the Semantic Bus 208, and the Semantic Analysis Logic 210. Connection to the Policy Management Software 212, which is responsible for enabling the user 214 to create, edit, read, update, delete, store, and manage Policies, is conceptually done through a simple API, represented as the two arrows labeled "Semantic Analysis Request" and "Semantic Analysis Result" shown in FIG. 2.

Model Repository (201)

Figure 3:
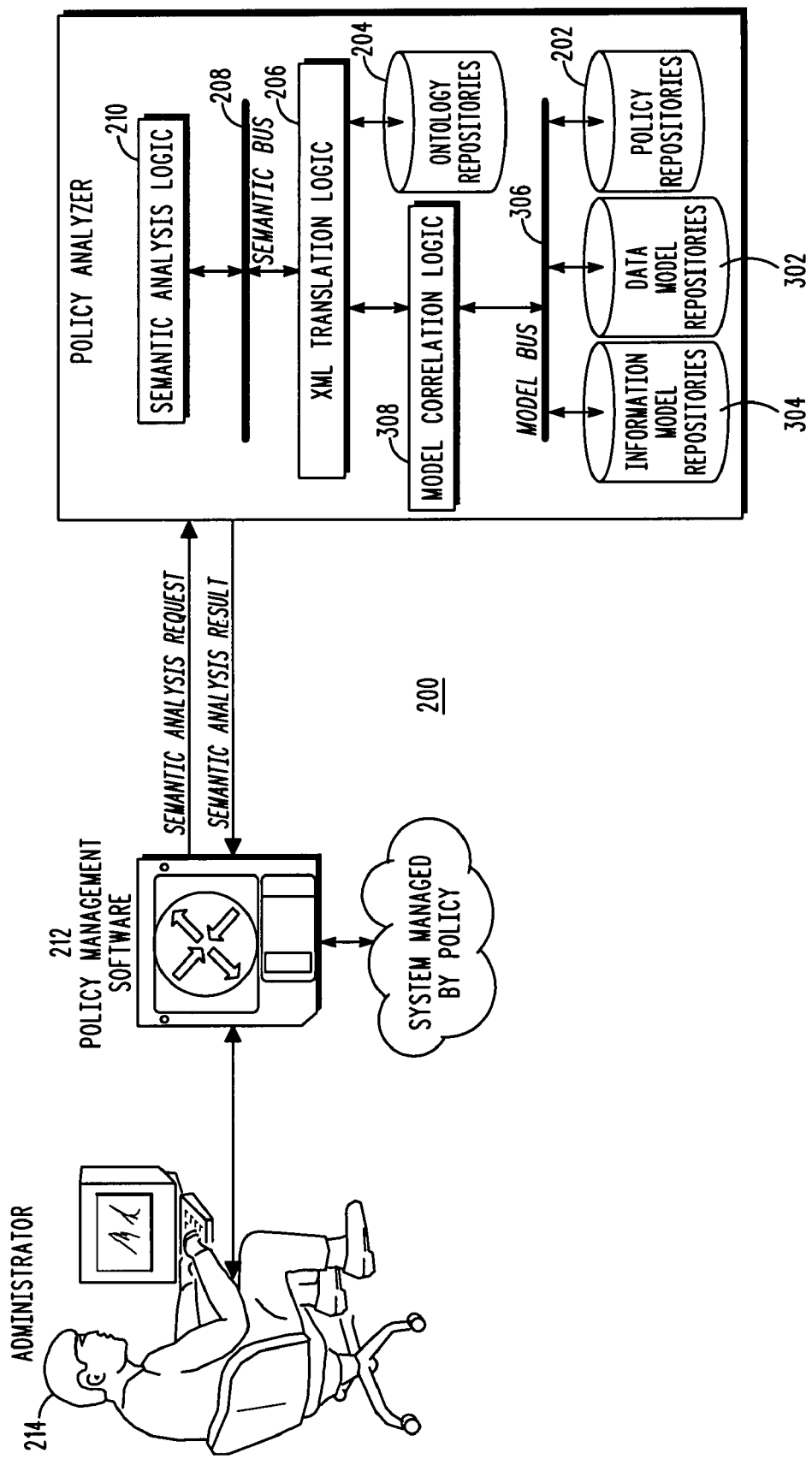
FIG. 3 is a representative diagram of a modified system of FIG. 2, for performing policy conflict detection and resolution using semantic analysis, according to an embodiment of the present invention.

Information and data models are stored in the Model Repository 201. One preferred embodiment of the present invention will use the simplified Directory Enabled Networks-new generation (DEN-ng) policy model, as described in *Policy-Based Network Management*, John C. Strassner, Morgan Kaufmann Publishers, 2004—the contents of which are hereby incorporated by reference, for its information and data model representation, as this approach enables a close correlation to be maintained between the information model and the set of data models. Note that there will usually be a set of data models, since different management data has different characteristics and usage patterns, requiring different repository implementations for both the storing and querying of management data. If the embodiment shown in FIG. 2 is not used, then equivalent functionality must be supplied. FIG. 3 provides a superset of the capabilities of FIG. 2.

For purposes of the present invention, an "information model" is defined as an abstraction and representation of the entities in a managed environment. This includes definition of their attributes, operations, and relationships. It is independent of any specific type of repository, software usage, or access protocol. A "data model," as used herein, is a concrete implementation of an information model in terms appropriate to a specific type of hardware and software platform, defining a single repository that uses a specific access protocol or protocols and language or languages to define its management data. It includes data structures, operations, and rules that define how the data is stored, accessed, and manipulated.

In general, the information model and data models can be located in multiple repositories, since vendor-specific devices and applications usually have their own vendor-specific data models that are used. Developers may not have derived their data models from a single information model; hence, there may be no inherent correlation between objects and attributes in each of the data models. Furthermore, policies often use information and/or data models for their construction and specification. FIG. 3 generalizes the approach of FIG. 2 by enabling data from all three repositories, the Policy Repository 202, the Data Model Repository 302, and the Information Model Repository 304, to be sent via a Model Bus 306, to Model Correlation Logic 308, whose function is to determine how each element of each repository is related to each other. This is discussed further below. However, this is not the optimal representation of the present invention, for reasons to be shown shortly. Rather, the purpose of FIG. 3 is to illustrate the subtle problems involved in various scenarios, and to show how this invention handles them.

Policy Repository (202)

Policies are stored in the Policy Repository 202. This may be done before or after the Policy is input to the present invention, as well as before or after the component(s) interested in using the Policy have started its/their processing. This is done to ensure compatibility with legacy systems, since many early policy management implementations recommended storing the Policy first, before any validation or processing of it was done.

Embodiments of the present invention can accommodate two very different forms of policies. The first, and preferred form of policy, is a representation which either uses or is derived from knowledge from information and/or data models (i.e., the information and/or data model is used to define and represent the structure of the policy rule, as is shown in *Policy-Based Network Management*, John C. Strassner, Morgan Kaufmann Publishers, 2004). The logic necessary to accommodate this form of policy is shown in FIG. 3. Note that in this figure, the Policy Repositories 202 have been separated from the Ontology Repositories 204. This is because in this approach, the policy is already in a form compliant with information model and data model processing, while the ontology is not. Hence, knowledge from the information, data, and policy repositories is combined into the model bus 306 and then analyzed using the model correlation logic 308, while knowledge from the ontology, due to its different format and representation, are separated and fed directly into the XML translation logic. Two examples of this form of policy are Ponder2, a description of which can be found at http://ponder2.net/, and DEN-ng, a description of which can be found in the above referenced Policy-Based Network Management book. The second form of policy is one in which an information or data model is not the primary element used to define the representation or structure of a policy; rather, an ontology is used to do this. Examples of this approach can be found in A. Uszok, et. al., "*KAoS Policy and Domain Services: Toward a Description-Logic Approach to Policy Representation, Deconfliction, and Enforcement*" and Lalana Kagal, Tim Finin, and Anupam Joshi, "*A Policy Language for a Pervasive Computing Environment*", the entirety of which is hereby incorporated by reference. This requires a slight modification of FIG. 3, as shown in FIG. 4, and explained in detail below.

Policy Correlation Logic (402)

Figure 4:
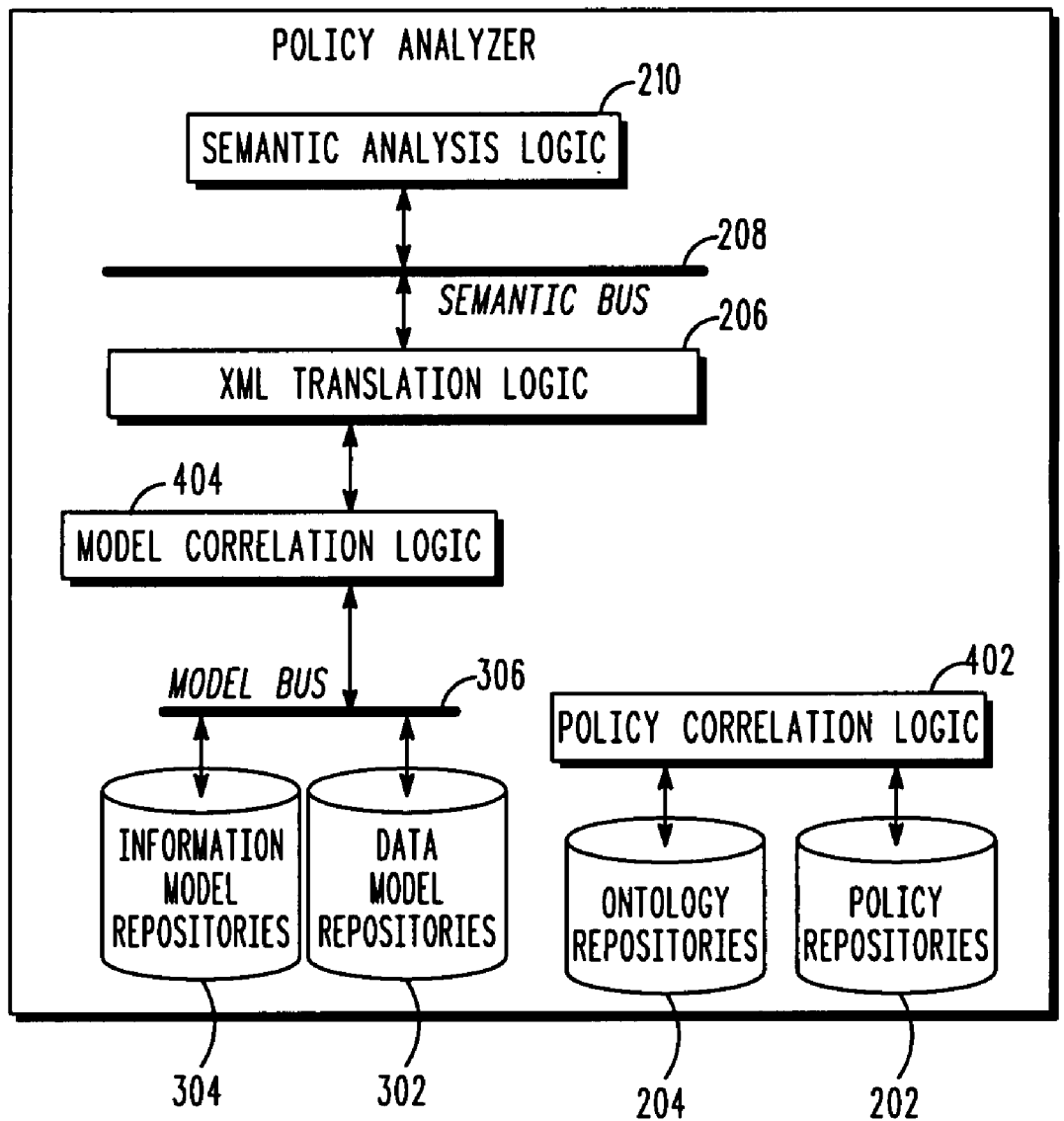
FIG. 4 is a representative diagram of a modified system of FIG. 3, where an ontology is used as the primary element for defining the representation or structure of a policy, according to an embodiment of the present invention.

The purpose of the Policy Correlation Logic 402, shown in FIG. 4, is to examine the format and structure of the policies in each of the possibly many Policy and Ontology Repositories to determine if each policy is derived from either a model (information or data model) or an ontology. If it is, then this logic is able to verify that the policy rule is correctly formed by comparing its representation to that of the representation defined in the corresponding model and/or ontology.

Model Correlation Logic (404)

Figure 5:
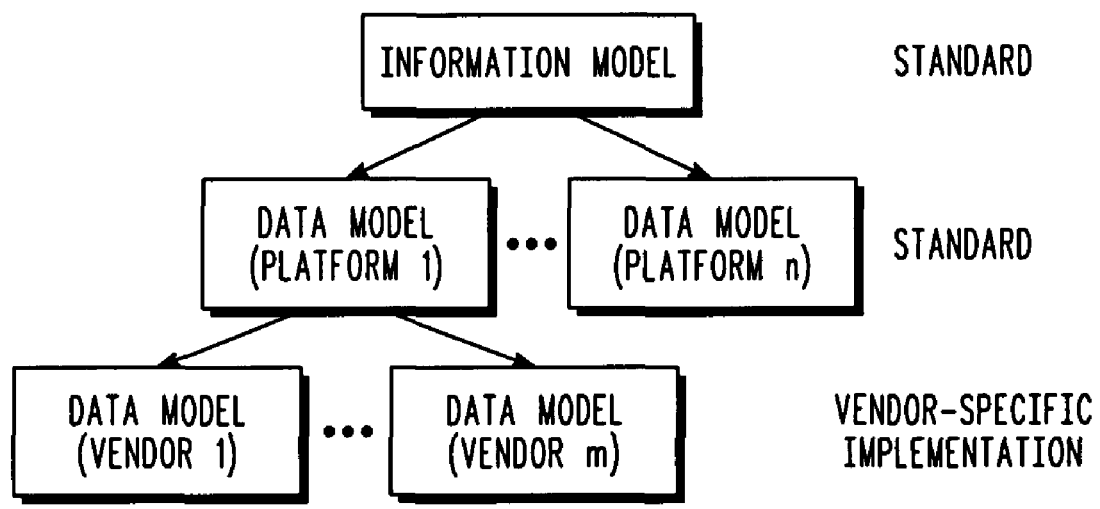
FIG. 5 is a representative diagram of model mapping, according to an embodiment of the present invention.

The Model Correlation Logic 404, shown in FIG. 4, performs a model mapping between the different data models in the system. An exemplary model mapping is shown in FIG. 5. A model mapping is a translation from one type of model to another type of model. Model mapping changes the representation and/or level of abstraction used in one model to another representation and/or level of abstraction in another model. Hence, its output is a normalized form of data contained in the possibly different set of data models being used in the system.

One might wonder why the Policy Correlation Logic 402 does not feed the Model Correlation Logic 404. There are two reasons for this. First, if a policy is not derived from an information and/or data model, then it makes no sense to connect the output of the Policy Correlation Logic 402 to the input of the Model Correlation Logic 404. Second, even if a policy is derived from an information and/or data model, the representation and structure of the policy may not be completely defined by the models. Hence, additional examination of the policy specification is desired.

Ontology Repository (204)

Ontologies have their root in philosophy, where the study of ontology is a branch of metaphysics that deals with nature of being. In computer science and knowledge engineering, ontologies define theories of what exists. For purposes of the present invention, ontologies are interesting for at least two reasons: 1.) ontologies offer a formal mechanism for defining a better understanding of facts, and 2.) shared ontologies ensure that different components and applications communicate about different aspects of the same entity in a standard way.

Ontologies are used to model declarative knowledge. By this, we mean knowledge in which the relationships between the data are declared, or stated, and then one or more automatic mechanisms are used to answer queries about the data.

Numerous definitions of ontologies can be found. Once such definition is found in J. Strassner, "*Knowledge Engineering Using Ontologies*", chapter submitted to Elsevier Publishing for the book "*International Handbook of Network and System Administration*", to be published in 2007, the entirety of which is hereby incorporated by reference. For purposes of the present discussion, an ontology is defined as: a formal, explicit specification of a shared, machine-readable vocabulary and meanings, in the form of various entities and relationships between them, to describe knowledge about the contents of one or more related subject domains throughout the life cycle of its existence. These entities and relationships are used to represent knowledge in the set of related subject domains. Formal refers to the fact that the ontology should be representable in a formal grammar. Explicit means that the entities and relationships used, and the constraints on their use, are precisely and unambiguously defined in a declarative language suitable for knowledge representation. Shared means that all users of an ontology will represent a concept using the same or equivalent set of entities and relationships. Subject domain refers to the content of the universe of discourse being represented by the ontology.

The Ontology Repository 204 is used to store one or more ontologies that are used in semantic analysis of both Policies and model elements that the Policies refer to. The Ontology Repository 204 is a separate storage entity because of at least two reasons. First, the Ontology Repository 204, being a separate storage entity, enables the use of common off the shelf (COTS) components to realize the Repository 204; note that such COTS components also include additional tools, such as reasoners, which can be used by the Semantic Analysis Logic, that are not part of COTS components to realize Model and Policy Repositories 302, 304, and 202, respectively. Second, the structure of the ontology data, as well as the protocols used to access and edit those data, are significantly different than those of information and data models.

XML Translation Logic (206)

Figure 6:
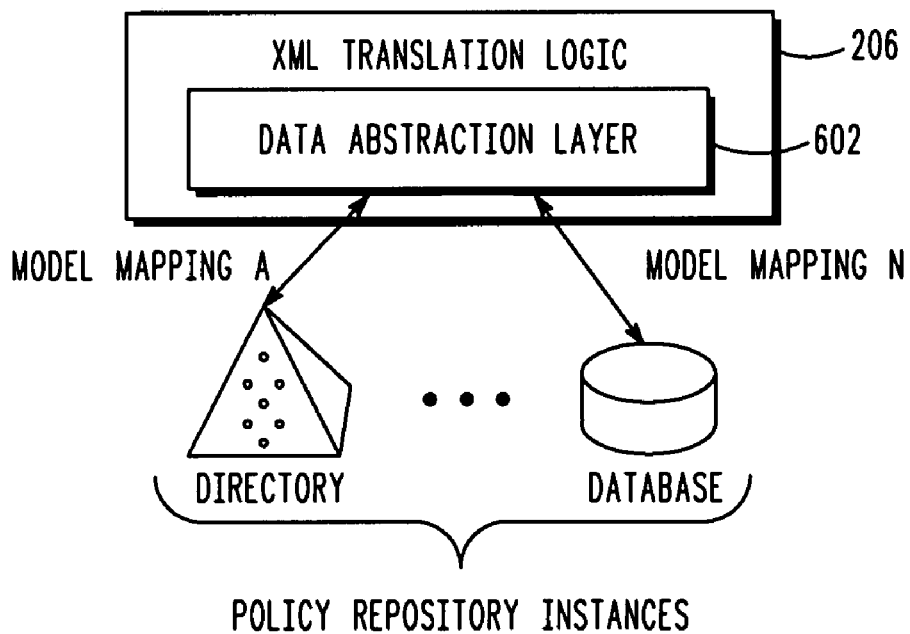
FIG. 6 is a representative diagram of XML Translation Logic, according to an embodiment of the present invention.

The XML Translation Logic 206, of FIG. 2, is shown in greater detail in FIG. 6. The XML Translation Logic 206 contains a Data Abstraction Layer 602 that enables embodiments of the present invention to be used with different types of storage mechanisms, and hence different types of repositories. FIG. 6 emphasizes the principle of abstraction. DEN-ng is an information model, which is independent of platform, language and protocol, but is used to define one or more data models for the system. Each data model is fine-tuned to a particular set of platform, language, and protocol requirements. This enables different applications to make use of different management information, since each type of management information has its own storage, access, and other requirements. It is impossible, or at least very difficult, to design a single repository that can simultaneously meet all of these different needs, since for example each type of management data requires different query languages (and hence different types of data structures) to meet different requirements of different management applications. This problem is solved by using a combination of a common information model (e.g., DEN-ng) and a set of standard model mappings that translate information (including the definition and representation of Policies) into one or more data models.

The role of the common information model is to define the information in a technology-neutral fashion once, so that different model mappings can be used to translate this data according to the specific needs of a particular repository in an optimal fashion. Thus, the common information model and the set of model mappings are used together to implement the conceptual Policy Repository 202 shown in FIG. 3. Hence, this Policy Repository 202 accommodates the storage of Policies with the data that they apply to, which is useful for enabling model driven code generation.

Without a common data abstraction layer, the n different systems that need to access data in the Policy Repository 202 must access that data from potentially m different data stores. This is very undesirable, as it means that each of the n data processing systems must support up to m different protocols and interfaces, which in turn implies at least one (but probably more) language, with its own set of data structures. A much better, and more scalable, solution is to provide a common Data Abstraction Layer 602, whose purpose is to determine from which Repository to get the requested data. In order to do this, the Data Abstraction Layer 602 may also need to reformulate the original query posed by the data processing component in order for that query to be executed in a more efficient manner. Thus, we centralize this problem and require just the Data Abstraction Layer 602 of the Policy Repository 202 to shoulder the burden of interfacing with the plethora of different data processing components that comprise the rest of the Policy Management System 200.

The Data Abstraction Layer 602 provides a single interface to a multiplicity of Policy 202 and Ontology 204 Repositories. The XML Translation Logic 206 translates the different types of queries and commands that each Repository 202, 204 understands into a common XML format, and vice-versa.

Semantic Bus (208)

Figure 7:
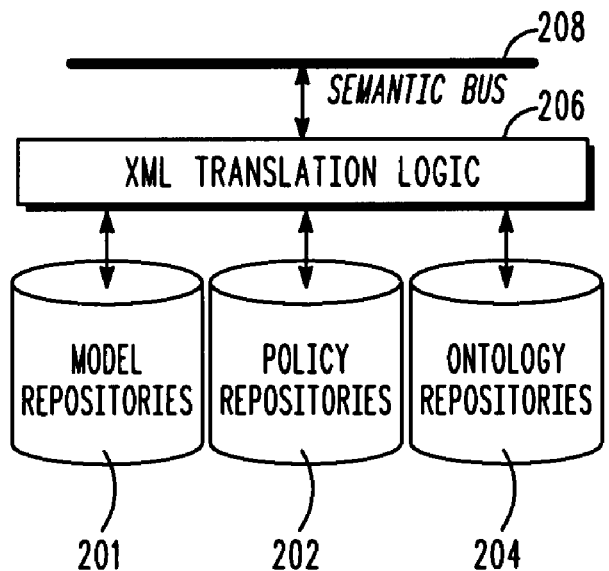
FIG. 7 shows the Ontology Repository, Policy Repository, Model Repository, XML Translation Logic, and Semantic Bus of FIG. 2, according to an embodiment of the present invention.

The purpose of the semantic bus 208 is to provide a single interface for enabling the Semantic Analysis Logic 210 to communicate with the Model Repository 201, the Policy Repository 202, and with the Ontology Repository 204. Since the structure and representation of data in these two repositories is different, embodiments of the present invention insert adaptation software to translate native data received from either repository to a common XML-based format for the Semantic Analysis Logic 210 to process. Similarly, data from the Semantic Analysis Logic 210 that needs to be stored in either repository is converted from the common XML-based format to a native format appropriate for the particular repository that is being used. This is shown in FIG. 7. One advantage of this approach is that the different components of the Semantic Analysis Logic 210 can now be designed and implemented using a single data format.

Semantic Analysis Logic (210)

The Semantic Analysis Logic 210 includes a set of mechanisms that provide two functions: 1.) Detecting semantic conflicts between two policies at the same level of abstraction (e.g., between two business policies), and 2.) Detecting semantic conflicts between two policies at different levels of abstraction (e.g., between a business policy and an implementation policy). The Semantic Analysis Logic 210 uses ontologies to accomplish the above two tasks.

Template

The concept of a template is fundamental to certain embodiments of the present invention. As used in this invention, a template is a pre-defined pattern that is used to design new policy rules, groups of policy rules, and their constituent components. Conceptually, a policy template is similar to how templates are used in popular word processing programs. In the present invention, a template is used to simplify the processes of reusing and customizing existing policy rules to meet the specific needs of a given application.

Embodiments of the present invention assume the use of a combination of keywords and noise words to demarcate various fields in a template. A keyword is an identifier that has a particular meaning to the policy language being analyzed. Keywords are "reserved words", meaning that they have a particular meaning to the language, and hence cannot be used generically. For example, a keyword such as "IF" may identify a flow of control, and hence cannot be used in a generic sense, such as for the name of a variable. Noise words are language elements that are present only for the purpose of making it easier for certain constituencies to understand a word, phrase, or sentence; however, noise words don't change the meaning of that word, phrase, or sentence. For instance, in the sentence "Mary has retrieved a total of 10 records," "has" and "a total of" are noise words, as neither provide any useful information above or beyond the other words.

Figure 8:
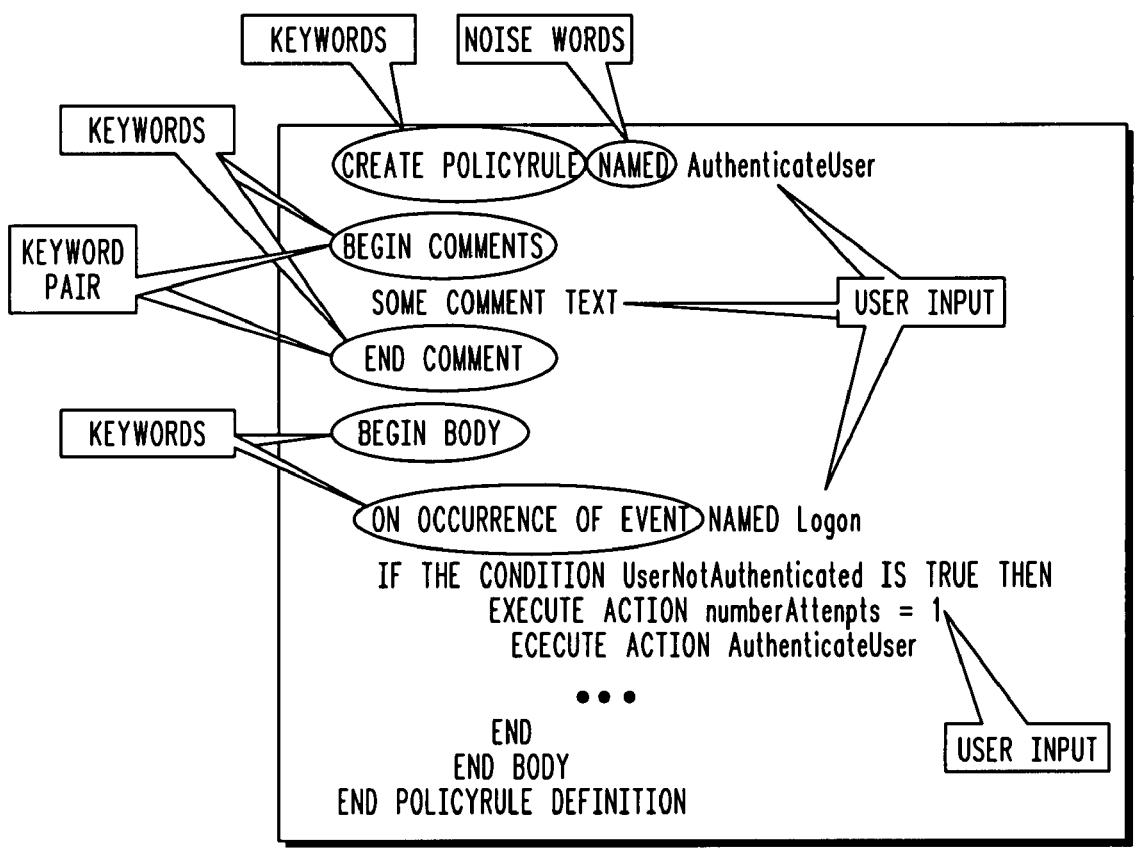
FIG. 8 is a representative diagram of the concept of a template, according to an embodiment of the present invention.

We assume that a combination of keywords and noise words are used to demarcate fields that have special meaning in the policy languages that are examined by this invention. This enables the policy author to indicate specific fields (e.g., words, numbers, or even sentences) that are contextually significant to the end-user. In this approach, keywords are used to impart meaning, while noise words are used to make the sentence or phrase easier to understand for novice users. This invention can be used for languages that do not use this approach, as long as there is a means of differentiating the set of fields that are editable by the user from the non-editable structure of the policy rule. The concept of a template is shown in FIG. 8.

One preferred use of key words is as a pair. Two examples of such pairs in FIG. 8 are the pair "BEGIN COMMENT"—"END COMMENT" and the pair "CREATE POLICYRULE"—"END POLICYRULE DEFINITION". This makes the template easier to parse, as the pair of keywords identifies a field. It also makes the meaning of the policy easier to understand for the novice user, as the additional noise words make the phrase more readable. The present invention can cope with keywords that do not form such pairs as long as the policy grammar is available in a machine-readable form.

Detecting, Validating and Fixing Template Modifications

Enabling a user to customize a template also enables the user to modify that template and/or its contents into a potentially wrong or unrecognizable state. Embodiments of the present invention advantageously avoid this problem by detecting modifications to the template, validating their correctness, and then either automatically fixing any problems detected or presenting the erroneous text to the policy author so that the policy author can fix it.

Referring to FIG. 8, the combination of keywords and noise words are used to establish a particular context for validating user input. For example, the noise word "NAMED" occurs in two different contexts ("CREATE POLICYRULE NAMED <user input>" and "ON OCCURRENCE OF EVENT NAMED <user input>"). Each context can have different rules for determining if the user-supplied input ("AuthenticateUser" and "Logon", respectively, as shown in FIG. 8) is correct or not. Put another way, the present invention may use one set of rules to determine if the first user-supplied input ("AuthenticateUser") is correct, and a completely different set of rules to determine if the second user-supplied input ("Logon") is correct. Hence, the invention establishes the particular context for each entry in each of its templates. The establishment of context means that the invention can recognize situations which do not follow the pre-defined rules of the template. For example, if a user modifies the keyword "CREATE POLICYRULE" to "CREATE RULE", embodiments of the present invention can match these terms with a particular confidence level and then either (1) change the user modified term back to the form in the template and/or (2) locate the keyword's pair and convert it to a similar format. Of course, this invention can also query the user to determine what the user would like to do in such a case—revert back to the "standard" form as defined in the template, or modify the template.

A logical question may be, "if the template is followed exactly, how can there be a conflict?" A simplistic definition of the term "policy conflict" is as follows: A policy conflict occurs when the events of two or more policy rules cause the conditions of those policy rules to execute at the same or an overlapping time period that apply to the same set of managed objects, but the actions of two or more of these policy rules conflict with each other. In other words, even if the user follows the template exactly, the user may still unwittingly cause a policy conflict due, for example, to the user's lack of understanding of the particular semantics associated with two policy rules. Such conflicts may be direct (causing a different action to happen to the same object) or indirect (causing resources required for other actions to become unavailable).

If the template is not followed, then the present invention has the opposite challenge of determining if an input is valid or not. The invention uses ontologies and semantic reasoning to determine whether an unknown element is valid or not. Semantic reasoning attempts to determine the set of meanings that an entity (e.g., a new word that is not in the vocabulary of the Policy Management System) has, as well as relationships between that entity and other entities that the system knows about (e.g., is it a synonym of another word). This will be further explained below.

Semantic Analysis Logic in Detail

Figure 9:
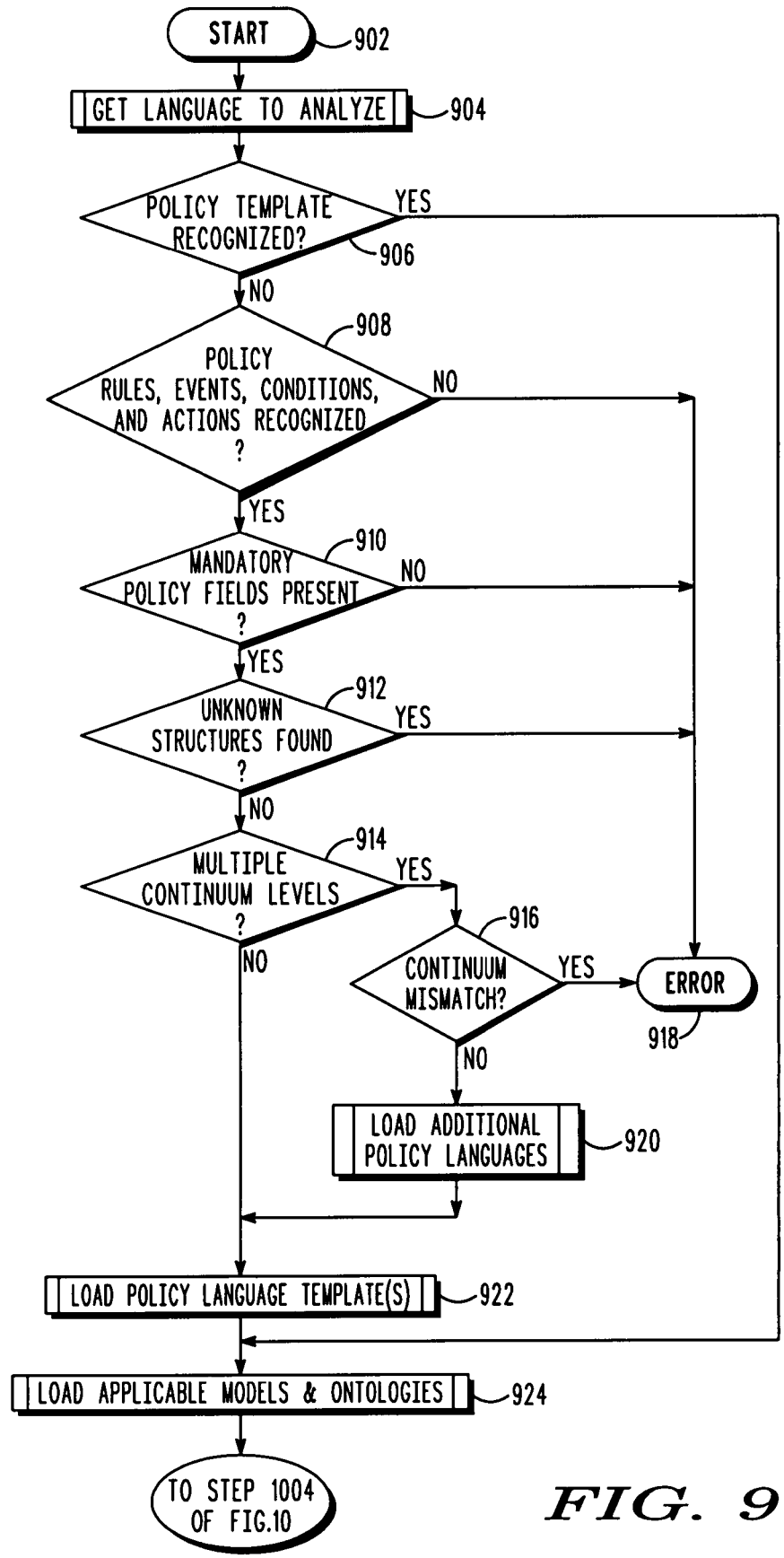
FIG. 9 is a flowchart illustrating the setup process for the approach shown in FIG. 10, according to an embodiment of the present invention.
Figure 10:
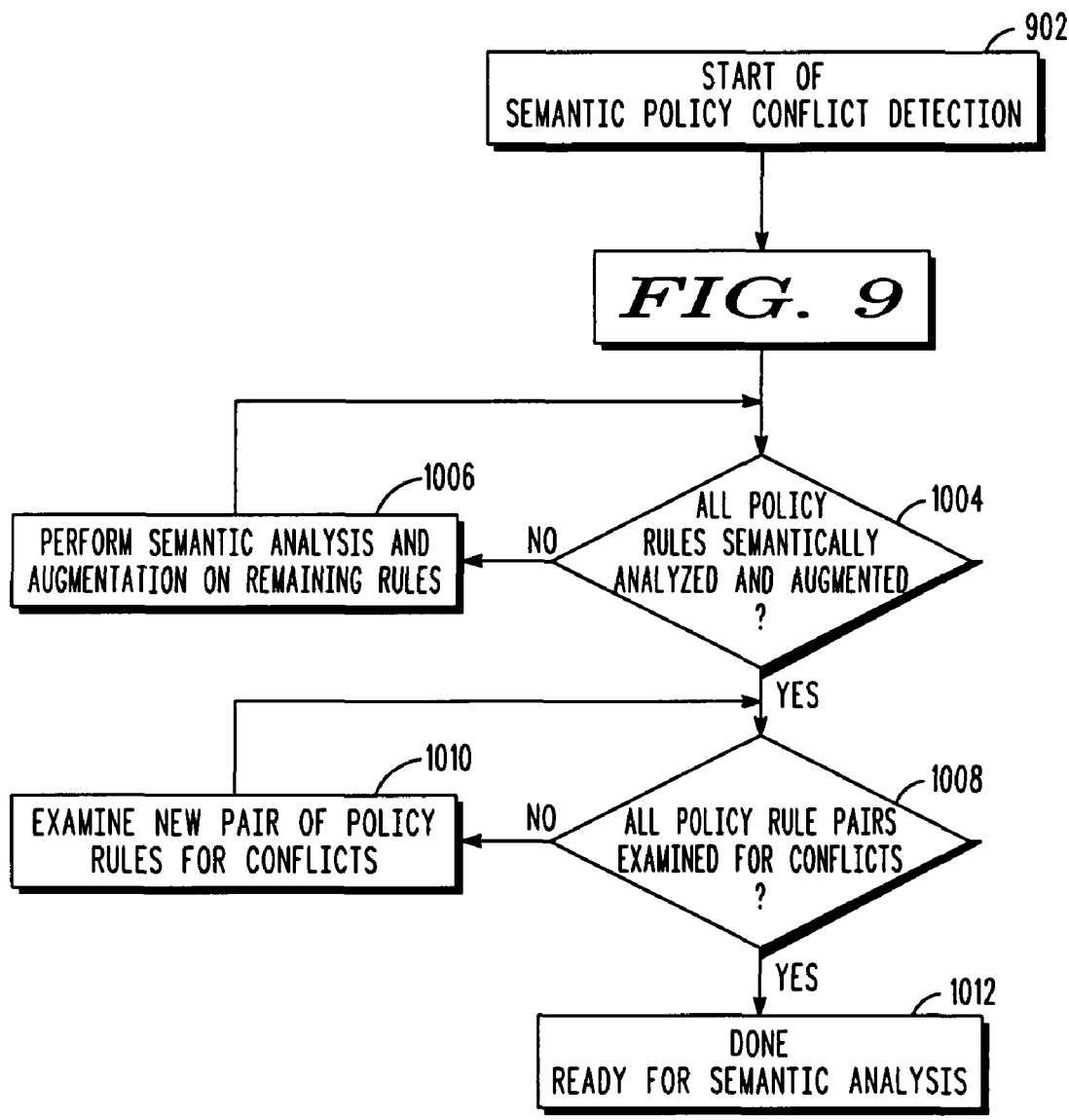
FIG. 10 is a flowchart illustrating one approach to determining semantic analysis conflicts, according to an embodiment of the present invention.
Figure 11:
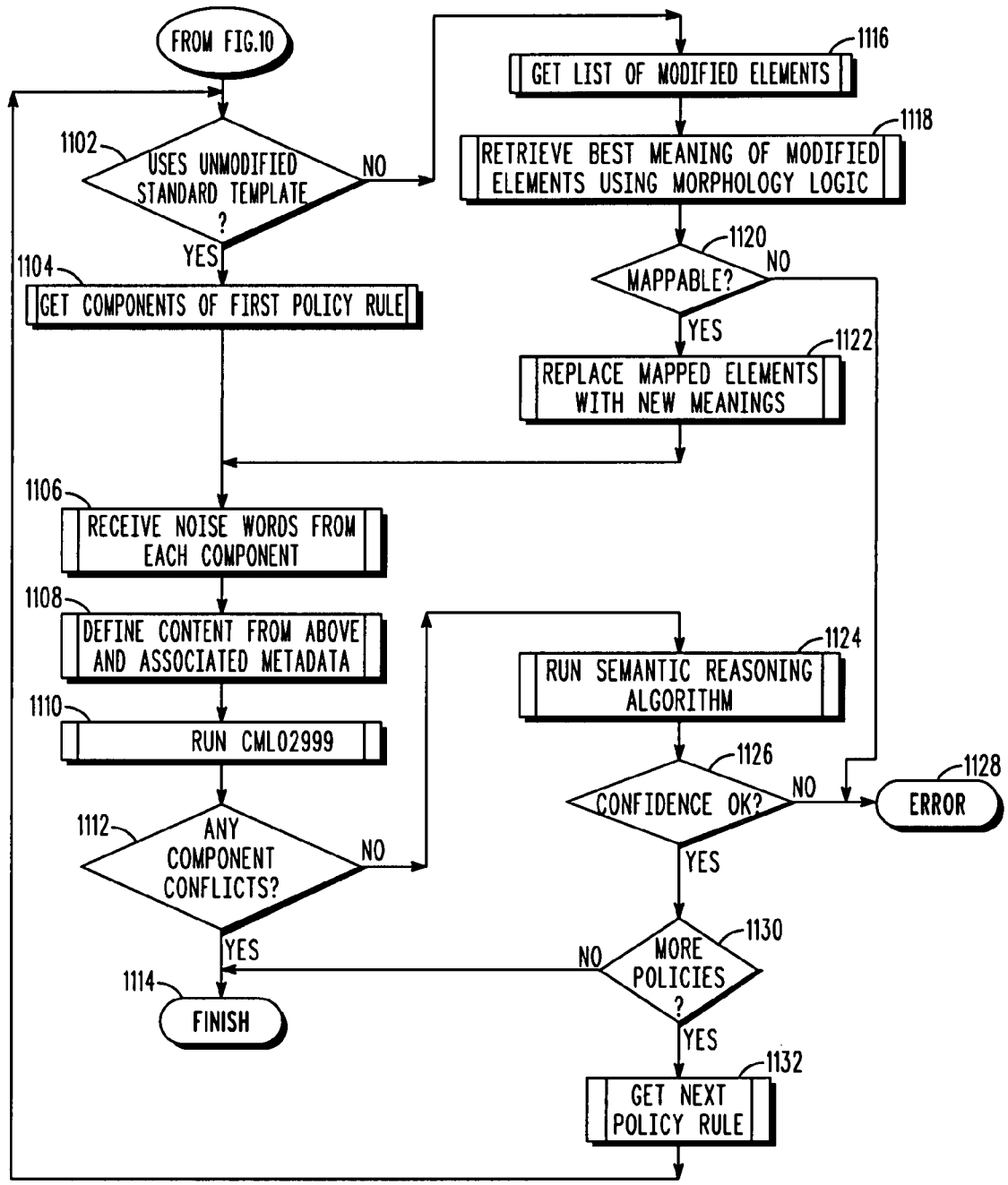
FIG. 11 is a flowchart illustrating an analysis processes that follows the completion of the setup operations shown in FIG. 10, according to an embodiment of the present invention.

The mechanism shown in FIG. 9 represents the setup required to semantically analyze and augment the set of policy rules to examine for conflicts (i.e., the steps shown in FIG. 10); the actual semantic analysis and augmentation is shown in FIG. 11.

The flow of FIG. 9 begins at step 902 and moves directly to step 904, where the semantic analysis and augmentation setup process is initialized by first retrieving the language that is to be analyzed from the Policy Repository 202. This enables this invention to be used for a plurality of languages. Hence, this first step 904 tries to match the subject language to one of its pre-defined languages stored in the Policy Repository 202. This is most easily done by matching the language to one of the policy templates, which are also stored in Policy Repository 202. This is because each policy template is constructed from a particular language. If a policy template is recognized, then the process skips the intermediate processing steps, as indicated in FIG. 9, and moves directly to step 924, since each policy template is defined using a particular policy language. If it cannot recognize the subject language as fitting one or more policy templates, the flow moves to step 908, where it then tries to recognize the most basic elements of a policy rule: a set of Policy Events, a set of Policy Conditions, and a set of Policy Actions. If it cannot recognize a Policy Rule and its constituent components, then this is either a malformed Policy or the input policy contains a structure that this invention cannot understand, and, in step 918, an error is raised.

If a Policy Rule and all of its constituent components are recognized in step 908, the flow moves to step 910 and checks to see if the requisite mandatory fields that make up the constituent components of the Policy Rule are recognized. For example, a Policy Condition must be of the generic form <variable>-<operator>-<value>. If it cannot, the flow moves to step 918, where an error is raised. If it can recognize the requisite mandatory fields that make up the constituent components of the Policy Rule, the flow moves to step 912 and then checks for any unknown data structures. For the purposes of this discussion, an unknown data structure is a grammatical construct that the present invention cannot understand. For example, a noun or verb may have been introduced into the policy rule that is not in the language specification that this invention is currently using. For example, an unknown noun could be an unknown Managed Entity, and an unknown verb could indicate a particular policy action or constraint that is currently undefined. Either of these indicates that key parts of the input language are unknown to this invention, and so an error is raised. In this context, "largely unknown" is a qualitative assessment which determines whether enough of the key elements of the language are known (i.e., have existing definitions and relationships both in the models as well as in the ontologies) or not.

If unknown structures are found in step 912, the flow moves to step 918 and an error message is produced. Alternatively, if the policy language is recognized, the policy continuum level or levels referenced by the language are then retrieved. This is needed to ensure that the user hasn't crafted a language that uses elements from two different continuum levels, as this is not allowed due to the inherent mismatch of concepts involved. Note that multiple policy continuum levels are allowed, as long as they are embodied in separate policy rules. Construction and management of a policy continuum, along with translation of policies into forms appropriate for differing layers of a policy continuum within a network, is disclosed in United States Patent Application Publication Number 20080162109 entitled "Creating and Managing a Policy Continuum" published on Jul. 3, 2008, which is hereby incorporated by reference in its entirety. Hence, the system checks, in step 914, for the presence of multiple levels of the policy continuum. If multiple levels are found, the flow moves to step 916 and checks for policy rules that have terms that are unique to two or more different levels. If these are found, the process terminates by creating an error message in step 918. Otherwise, additional policy languages are loaded in step 920, along with the templates, in step 922, for each policy language. These templates serve as filters to strip out words and phrases that do not add semantic meaning to the Policy Statement, so that the semantic analysis logic need only examine words that have an associated meaning. Based on this, a set of applicable information and data models, as well as ontologies, are loaded in step 924. Step 924 represents the end of the setup operations to start the operations shown in FIG. 10.

Semantic Analysis Logic

A process flow chart showing the operation of the Semantic Analysis Logic is shown in FIG. 10. Note that the present invention assumes that one or more of a set of pre-defined policy templates are used and that all of the language syntax and semantics used to write the policy rules being read is known. The significance of these two points is as follows. A policy template is a formal, regular structure that defines the representation of a policy rule and its components (e.g., the events, conditions and actions contained in a policy rule). If a policy template is not used, then the definition and structure of a policy rule must be dynamically discovered. Similarly, if the syntax and semantics of the language are not known ahead of analysis time, then these characteristics must also be dynamically discovered.

FIG. 10 shows an overall process flow of the semantic analysis logic described in FIG. 4. The flow of FIG. 10 starts at step 902, moves through the flow of FIG. 9, and then moves directly to step 1004, where a check is performed to determine whether all policy rules are semantically analyzed and augmented. For the purposes of this invention, the term "augmented" means that all relevant information and knowledge has been added to a given policy rule. This is done by first, matching the policy rule to a template and second, performing a semantic analysis on the content of that policy rule to incorporate additional knowledge in the form of semantic relationships (e.g., established linguistic relationships, including synonyms, antonyms, holonyms, and meronyms, as well as customized application-specific semantic relationships, such as "never occurs" and "is similar to"). The purpose of this augmentation is twofold: (1) to enhance the understanding of the policy rule by adding known relationships to the policy rule, and (2) to infer new relationships for the same intent. These two mechanisms enable the semantic conflict detection process to explicitly define intended meanings of the policy rule, in order to determine if a conflict exists. If the answer to step 904 is no, the flow moves to step 1006, where semantic analysis and augmentation is performed on any rules that have not been analyzed. The flow then moves back to step 1004 for another determination of whether all policy rules are semantically analyzed and augmented. If the answer to step 1004 is yes, the flow moves down to step 1008 where a check is made to ensure that all policy rule pairs have been examined for conflicts. If the answer is no, the flow moves to step 1010, where a new pair of policy rules are examined for conflicts. The flow then returns to step 1008 for another determination of whether all policy rule pairs have been examined for conflicts. If the result of step 908 is yes, the flow moves to step 1012 and finishes at the point where all Policy Rules are ready for Semantic Analysis.

In summary, the overall process performed by the steps of FIG. 10 ensures that all policy rules have been semantically analyzed and augmented as necessary. Once this is done, all policy rule pairs are examined for semantic conflicts.

After step 1012 of FIG. 10, the flow moves to step 1102 of FIG. 11. In step 1102, a determination is made as to whether an unmodified standard template is being used. If the Policy Rule uses an unmodified standard template, then the Policy Rule is formed from a "standard template definition" and hence, simpler mechanisms that require less computational resources can be employed to check for semantic conflicts than if the Policy Rule has modified a standard template. Therefore, if the answer to the inquiry of step 1102 is yes, the flow moves to step 1104. In step 1104, the components (i.e., a set of Policy Events, a set of Policy Conditions, and a set of Policy Actions) of the first Policy Rule are retrieved.

Semantic conflict detection is computationally expensive. Best practices dictate that simpler conflicts first be detected. An exemplary check for this case includes removing the noise words, step 1106, establishing the context, step 1108, and then running the process which is an efficient way to determine if there are simple conflicts present as described in United States Application Publication Number 20080126287 entitled "Method For Management of Policy Conflict in A Policy Continuum" published on May 29, 2008, which is hereby incorporated by reference in its entirety. Step 1112 checks to see if there are conflicts present. If the answer to step 1112 is yes, then the function terminates at step 1114; if not, then the invention takes the "No" branch from step 1112 to check for semantic conflicts.

Figure 12:
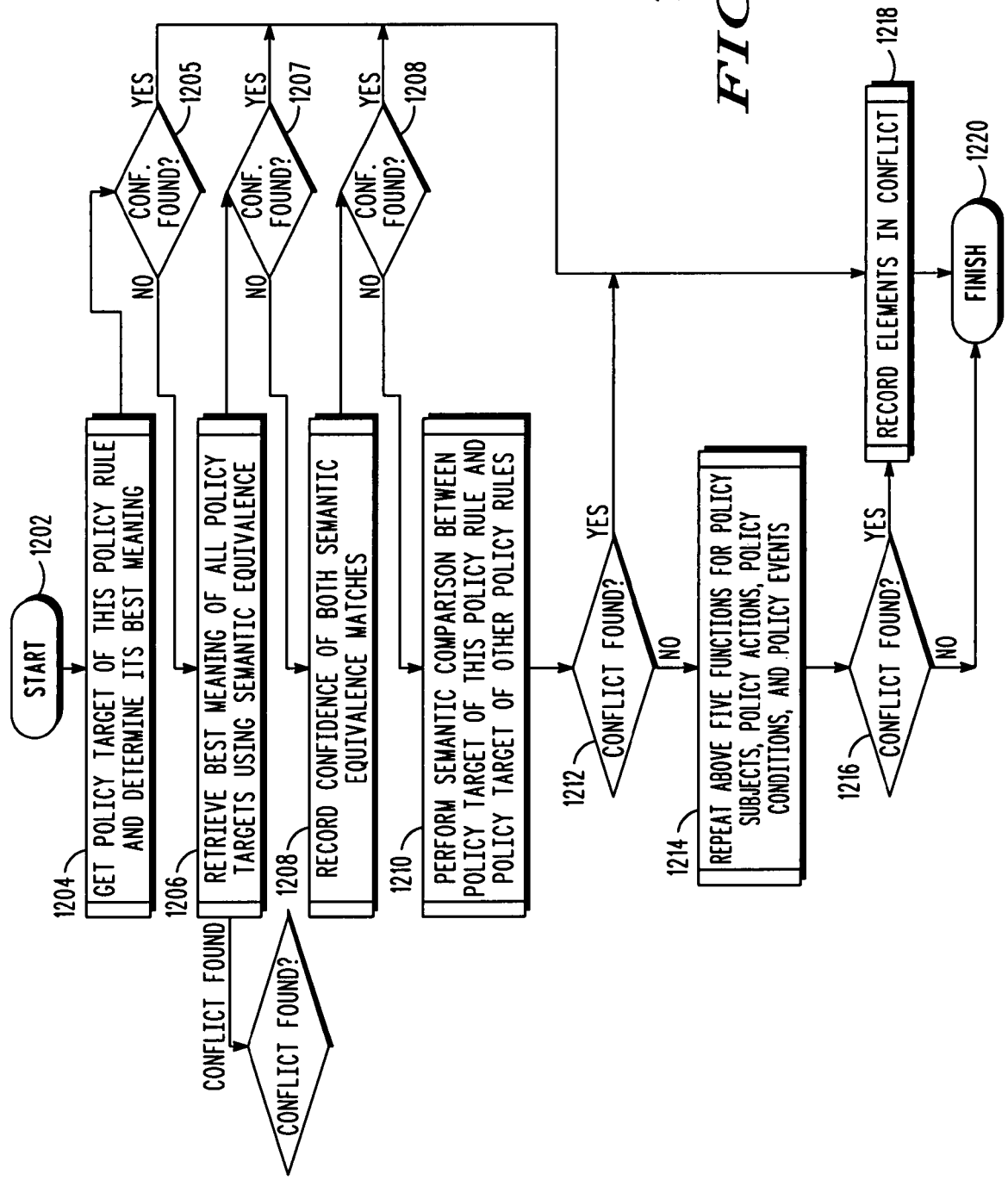
FIG. 12 is a flowchart illustrating the "Run Semantic Reasoning" function of the flow chart of FIG. 11, according to an embodiment of the present invention.

Semantic conflict checking is performed, in step 1124, using any semantic reasoning algorithm that can determine the semantic equivalence between a component of the Policy Rule to be examined and all other Policy Rules. An example of such an algorithm is given in A. Wong, P. Ray, N. Paramesh, J. Strassner, "*Ontology Mapping for the Interoperability Problem in Network Management*", JSAC 2005 special publication on semantics. Further details of the "Run Semantic Reasoning" function of step 1124 are shown in FIG. 12. This function iterates over each component of the Policy Rule to check if the "best" meaning for that particular language element of the Policy Rule (i.e., what the Policy Subject and Target refer to, and what the exact Policy Event, Condition, and Action clauses entail) conflicts with any other Policy Rule. If this process fails to determine a "best" meaning, then an error is raised; otherwise, the flow moves to step 1126 where a confidence check is performed. This enables the invention to use a programmable threshold to measure the accuracy of the semantic equivalence matching. If sufficient accuracy is not obtained, then the processing moves to 1128 and terminates with an error; otherwise, a check is made, in step 1130, to see if there are additional policies. If there are, the next Policy Rule is retrieved in step 1132 and the process repeats, starting again at step 1102. Otherwise, the process terminates at step 1114.

FIG. 12 shows a functional block diagram of the semantic reasoning process of step 1124. Up to five successive tests for semantic equivalence between the components of a Policy Rule are performed. The first step, 1204, gets the Policy Target of the Policy Rule and determines its best meaning. The next step, 1206, retrieves the best meaning of all policy targets by using semantic equivalence. A following step, 1208, records the confidence of both of the Semantic Equivalent matches. In step 1210, a Semantic comparison is performed between the Policy Target of the Policy Rule and the best meaning of the Policy Target of the other Policy Rules. If at any time a conflict is found or if one of the steps 1204, 1206, 1208, and 1210 fail in their objective, steps 1205, 1207, 1209, 1212 records the errors or conflicts in step 1218, and terminates in step 1220; otherwise, it continues through all four checks 1204, 1206, 1208, 1210 and culminates in step 1212, which determines if a conflict exists between the Policy Target of this Policy Rule and any of the Policy Targets of the other Policy Rules being tested. (Note that a variant of this process could just as easily record the set of conflicts found and proceed; this invention is describing the most computationally efficient of a number of variants of this process.) If all five tests pass, this function returns to step 1126 of FIG. 11 for additional processing.

For example, assume two Policy Rules, A and B, are being checked for conflicts. Assume further that Policy Rule A contains two Policy Targets, and Policy Rule B contains three Policy Targets. FIG. 12 will first parse Policy Rule A into its constituent components, namely its Policy Subjects, Policy Targets, Policy Events, Policy Conditions, and Policy Actions. Then, it will retrieve the best meaning for each of the two Policy Targets in Policy Rule A in step 1204. If the process is unable to either find a Policy Target or retrieve the best meaning of a Policy Target, then an error is raised. Otherwise, in step 1206, the process retrieves the best meaning for each of the Policy Targets for each of the Policy Rules that this Policy Rule is being tested against. For example, assume that the Policy Targets of Policy Rule A are a host computer and an Internet gateway. Assume that the Policy Targets of Policy Rule B are a video monitor, a router, and a host computer. Through semantic analysis, the process compares synonyms, antonyms, holonyms, and meronyms, along with custom application-specific relationships as described earlier, to each Policy Target of each Policy Rule. The following can be concluded from this example as a result of this semantic analysis:

a) The two host computers in Policy Rules A and B must be checked for conflict, b) The video monitor doesn't conflict with any Policy Target of A, c) A host computer is a type of computing element, just like a router, switch, or modem, so the router and host computer of Policy Rule B must be checked for conflict with the host computer and Internet gateway of Policy Rule A.

Since all five semantic conflict tests are the same, only one will be described. The component of the Policy Rule to be examined (Policy Target is shown for illustrative purposes in FIG. 12) is retrieved. Then, the best meaning of the element of the Policy Rule being examined and the best meaning of that same element for all other Policy Rules are retrieved. The semantic equivalence confidence factor is recorded for all pairs. A semantic comparison of all pairs of the element of the Policy Rule being tested is then performed. If a conflict is found, the conflicting elements are recorded; else the next element of the Policy Rule is retrieved. This process starts with testing all Policy Targets, and then successively tests all Policy Subjects, Policy Actions, Policy Conditions, and finally Policy Events. The process then returns to step 1126 of FIG. 11 for further processing.

If, at step 1102 of FIG. 11, it was determined that the template was modified, then the template is analyzed to see if there is enough similarity between its structure and the language vocabulary and grammatical rules that have been pre-defined for use by the system. Put another way, the system now determines whether the inability to match a pre-defined template is because: the structure of the template has been changed (but not its grammatical elements); a small number of grammatical elements have either been changed or introduced, but the overall structure has been retained; or a combination of both.

Embodiments of the present invention can handle limited deviations from both the structure of the template as well as the introduction of new meanings for a given word and/or new words. This is accomplished using linguistic morphology, in step 1118. If the nature of the template deviations are relatively minor, the template can be modified to accommodate these changes using linguistic morphology. This is represented by decision block 1120, labeled "Mappable," along with the subsequent step, 1122. These tests are similar in nature to those described above, except that they are more granular. For example, since the template was not matched, then the process must determine the meaning of all words. If a new word or phrase is encountered, then the system must attempt to determine its meaning using its constituent morphemes.

A "morpheme", literally, is defined as "an element in a system of forms." Linguistics defines a morpheme as "the smallest form that is paired with a particular meaning." A "form" is any physical structure (e.g., combination of symbols). A word is usually constructed of multiple morphemes. Compound words, which combine multiple words, derive their meaning from their constituent morphemes. "Morphology" is the science of the structure of words. In linguistic morphology, a morpheme is the smallest lingual unit that carries semantics. A "lexeme" is an abstract unit that, in morphology, roughly corresponds to a set of words that are different forms of "the same word" (e.g., run, runs, running, and ran are forms of the same lexeme). The use of the forms of a lexeme is governed by rules of grammar (e.g., subject-verb agreement and compound tense rules). A lexicon consists of lexemes.

Morphology is a set of formal methods that analyze the structure of words of a language. This is done by breaking a word into its constituent morphemes. The meaning of the word is found by considering the effect that each of its constituent morphemes has. For example, a common way of designating a plural form in English is with the suffix "-s". However, when two morphemes have different meanings (e.g., "seahorse" and "catbird"), the resultant compound word has vastly different meaning than "just" changing it from a single to a plural form. Morpheme analysis is harder than it seems: the same morpheme can have vastly different meanings (e.g., "in" means "not" in words like incapable, but means "into" or "within" in words like include). When multiple forms have the same meaning, they could be different morphemes (e.g., "andr" in android and "man" both mean a male human) or one morpheme (e.g., "a-" and "-an", two different forms of the same Greek morpheme meaning not or without); these are also called allomorphs.

As in above, if at any time a meaning cannot be established, the process aborts with an error in step 1128; otherwise the process continues to step 1122. At this point, after following the flow of FIGS. 10-12, a set of semantic equivalence tests are run. These tests match the non-noise elements of the Policy Statement to terms in a universal lexicon, established by the combination of the knowledge in the Policy and Ontology Repositories, to arrive at a best meaning for the Policy Statement. This is then done for all Policy Statements, and finally for the Policy itself. If at any time a meaning cannot be established, the process aborts with an error; otherwise the process continues.

Note that in either of the above cases, the process might find different confidence levels assigned to different meanings. This can be resolved by repeatedly using one or more linguistic morphology processes to arrive at an agreed upon confidence. If the result is not OK, then the process is aborted and an error is raised. Otherwise, the system first checks for more Policy Statements (of the same Policy) and subsequently for different Policies.

Policy Server

Figure 13:
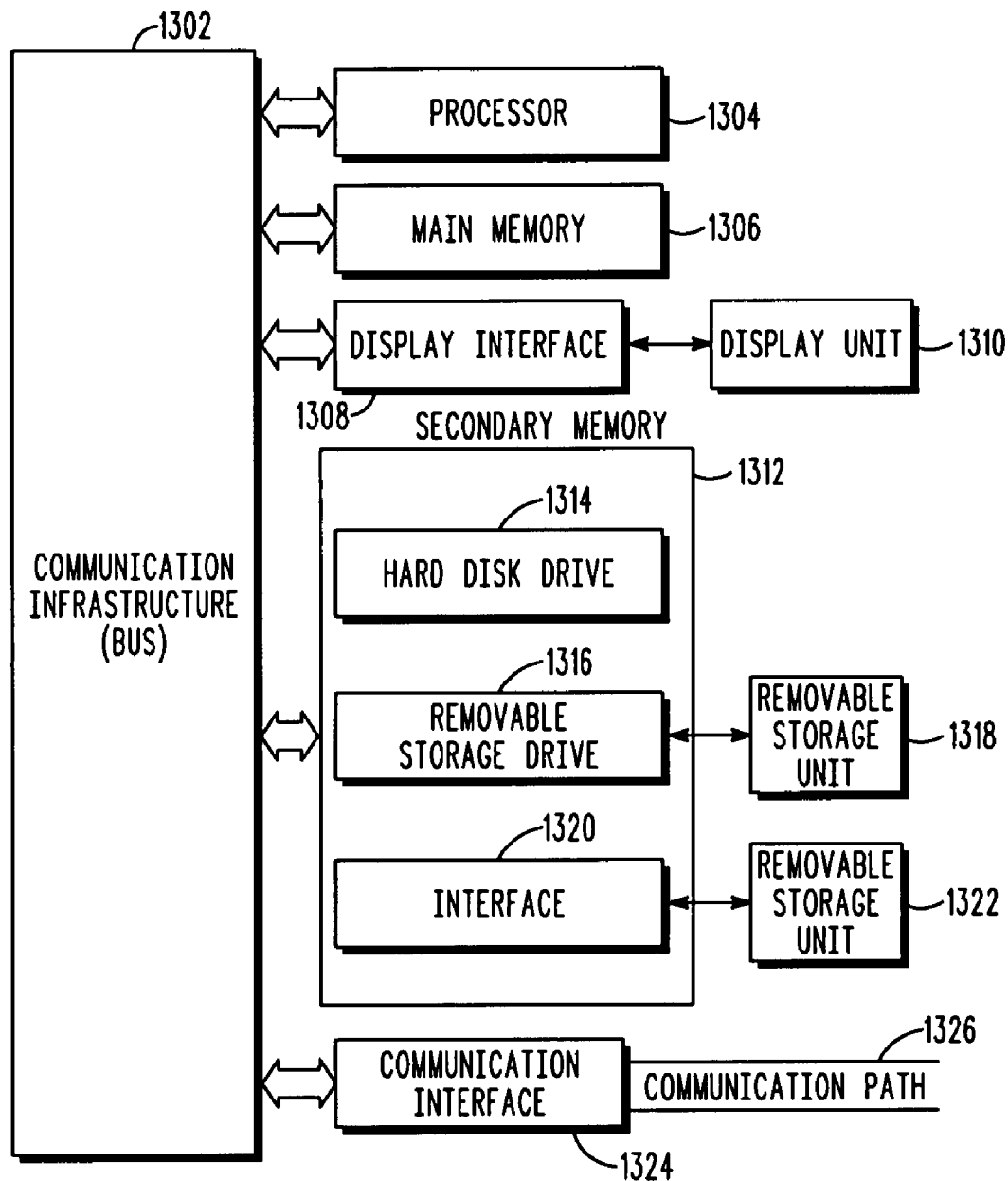
FIG. 13 is a high level block diagram of the policy server of FIG. 1, according to an embodiment of the present invention.

FIG. 13 is a high level block diagram illustrating a detailed view of a computing system 1300 useful for implementing the policy server 100 according to embodiments of the present invention. The computing system 1300 is based upon a suitably configured processing system adapted to implement an exemplary embodiment of the present invention. For example, a personal computer, workstation, or the like, may be used.

In one embodiment of the present invention, the computing system 1300 includes one or more processors, such as processor 1304. The processor 1304 is connected to a communication infrastructure 1302 (e.g., a communications bus, crossover bar, or network). Various software embodiments are described in terms of this exemplary computer system. After reading this description, it will become apparent to a person of ordinary skill in the relevant art(s) how to implement the invention using other computer systems and/or computer architectures.

The computing system 1300 can include a display interface 1308 that forwards graphics, text, and other data from the communication infrastructure 1302 (or from a frame buffer) for display on the display unit 1310. The computing system 1300 also includes a main memory 1306, preferably random access memory (RAM), and may also include a secondary memory 1312 as well as various caches and auxiliary memory as are normally found in computer systems. The secondary memory 1312 may include, for example, a hard disk drive 1314 and/or a removable storage drive 1316, representing a floppy disk drive, a magnetic tape drive, an optical disk drive, etc. The removable storage drive 1316 reads from and/or writes to a removable storage unit 1318 in a manner well known to those having ordinary skill in the art. Removable storage unit 1318, represents a floppy disk, a compact disc, magnetic tape, optical disk, etc. which is read by and written to by removable storage drive 1316. As will be appreciated, the removable storage unit 1318 includes a computer readable medium having stored therein computer software and/or data. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer-readable information.

In alternative embodiments, the secondary memory 1312 may include other similar means for allowing computer programs or other instructions to be loaded into the policy server 100. Such means may include, for example, a removable storage unit 1322 and an interface 1320. Examples of such may include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to the computing system 1300.

The computing system 1300, in this example, includes a communications interface 1324 that acts as an input and output and allows software and data to be transferred between the policy server 100 and external devices or access points via a communications path 1326. Examples of communications interface 1324 may include a modem, a network interface (such as an Ethernet card), a communications port, a PCM-CIA slot and card, etc. Software and data transferred via communications interface 1324 are in the form of signals which may be, for example, electronic, electromagnetic, optical, or other signals capable of being received by communications interface 1324. The signals are provided to communications interface 1324 via a communications path (i.e., channel) 1326. The channel 1326 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 1306 and secondary memory 1312, removable storage drive 1316, a hard disk installed in hard disk drive 1314, and signals. The computer program products are means for providing software to the computer system. The computer readable medium allows the computer system to read data, instructions, messages or message packets, and other computer readable information from the computer readable medium.

Computer programs (also called computer control logic) are stored in main memory 1306 and/or secondary memory 1312. Computer programs may also be received via communications interface 1324. Such computer programs, when executed, enable the computer system to perform the features of the present invention as discussed herein. In particular, the computer programs, when executed, enable the processor 1304 to perform the features of the computer system.

Conclusion

As should now be clear, embodiments of the present invention represent the underlying meaning of entities being modeled as one or more ontologies, and uses semantic reasoning to augment the knowledge obtained from the information and data models to better understand the intent of the policy author(s). This invention then constructs a policy continuum from the one or more policies supplied to it, and defines a set of mechanisms to manage the constructed policy continuum.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for performing policy conflict detection and resolution, the method comprising:
storing one or more policy rules within a memory of a computing system;
semantically analyzing and augmenting at least one component of each of the one or more policy rules by a processor of the computing system to incorporate additional knowledge in the form of semantic relationships to thereby generate a meaning for each at least one component of each of the one or more policy rules;
examining, by the processor, each pair of the one or more policy rules for semantic conflicts; and
in response to determining the presence of a semantic conflict, determining, by the processor, a semantic equivalence between a component of a policy rule and at least one other component of at least one additional policy rule;
wherein the determining a semantic equivalence is performed by using a semantic reasoning algorithm comprising:
determining a first policy target of a first policy rule and a second policy target of a second policy rule;
determining a meaning of the first policy target and a meaning of the second policy rule using the semantic analysis and augmentation;
assigning a confidence value based on the determining the meaning of the first policy;
assigning a confidence value based on the determining the meaning of the second policy;
performing a semantic comparison between the first policy target and the second policy target; and
determining, based at least in part on the semantic comparison, the presence of a conflict between the first policy target and the second policy target.

2. The method according to claim 1, wherein the determining a semantic equivalence comprises:
recording a semantic equivalence confidence factor for the component of the policy rule and the at least one other component of the at least one additional policy rule;
performing a semantic comparison of the component of the policy rule and the at least one other component of the at least one additional policy rule; and
determining the semantic equivalence using one or more policy statements stored in the memory.

3. The method according to claim 2, further comprising:
determining, by the processor, whether a policy rule is constructed from a known language and known components by identifying at least one construct of the policy rule and its contained policy events, policy conditions, and policy actions as existing in one or more pre-defined policy templates stored in the memory; and
calculating, by the processor, the semantic equivalence factor for each of the component and the at least one other component using the identified construct of the policy rule in the one or more pre-defined policy templates.

4. The method according to claim 1, where the determining of the presence of a conflict is subject to the confidence value of at least one meaning for at least one policy being above a programmable threshold.

5. The method according to claim 1, further comprising:
determining, by the processor, whether a policy rule has a corresponding set of at least one policy event, at least one policy condition, and at least one policy action; and
creating an error message, by the processor, when the policy rule does not have a corresponding set of at least one policy event, at least one policy condition, and at least one policy action.

6. The method according to claim 5, wherein the determining whether a policy rule has a corresponding set of at least one policy event, at least one policy condition, and at least one policy action includes:
determining, by the processor, the presence of one or more mandatory fields present in each of the one or more policy events, policy conditions, and policy actions to one or more pre-defined policy templates stored in the memory; and
creating an error message if the one or more mandatory fields are not present.

7. The method according to claim 6, further comprising:
determining the presence of at least one unknown data structure in the set of at least one policy event, at least one policy condition, and at least one policy action of a policy rule to one or more pre-defined policy templates stored in the memory; and creating an error message if an unknown structure is present.

8. The method according to claim 1, further comprising:

determining, by the processor, a presence of at least two policy continuum levels present in the policy rule and/or its policy events, policy conditions, and policy actions;

determining, by the processor, a mismatch of the at least two policy continuum levels; and creating an error message.

9. The method according to claim 1, further comprising:

determining, by the processor, the usage of a non-standard template to construct the policy;

determining, by the processor, the set of modified elements and terms in the policy;

using linguistic morphology logic, by the processor, to retrieve a meaning of each modified element in a set of modified elements and terms in the policy; and substituting, by the processor, the retrieved meaning for each of the modified elements and terms so that further analysis can take place.

10. A system for performing policy conflict detection and resolution, the system comprising:

a memory for storing one or more policy rules; and a processor communicatively coupled to the memory, the processor operating to:

semantically analyze and augment at least one component of each of the one or more policy rules to incorporate additional knowledge in the form of semantic relationships to thereby generate a meaning for each at least one component of each of the one or more policy rules;

examine each pair of the one or more policy rules for semantic conflicts; and in response to determining the presence of a semantic conflict, determine a semantic equivalence between a component of a policy rule and at least one other component of at least one additional policy rule;

wherein the processor operates to determine the semantic equivalence using a semantic reasoning algorithm and operating to:

determine a first policy target of a first policy rule and a second policy target of a second policy rule;

determine a meaning of the first policy target and a meaning of the second policy rule using the semantic analysis and augmentation;

assign a confidence value based on the determining the meaning of the first policy;

assign a confidence value based on the determining the meaning of the second policy;

perform a semantic comparison between the first policy target and the second policy target; and determine, based at least in part on the semantic comparison, the presence of a conflict between the first policy target and the second policy target.

11. The system according to claim 10, wherein the determining a semantic equivalence comprises operating the processor to:

record a semantic equivalence confidence factor for the component of the policy rule and the at least one other component of the at least one additional policy rule;

perform a semantic comparison of the component of the policy rule and the at least one other component of the at least one additional policy rule; and determine the semantic equivalence using one or more policy statements stored in the memory.

12. The system according to claim 10, where the determining of the presence of a conflict is subject to the confidence value for at least one meaning of at least one policy being above a programmable threshold.

13. The system according to claim 10, wherein the processor further operates to:

determine whether a policy rule has a corresponding set of at least one policy event, at least one policy condition, and at least one policy action; and create an error message if the policy rule does not have a corresponding set of at least one policy event, at least one policy condition, and at least one policy action.

14. The system according to claim 13, wherein the determining whether a policy rule has a corresponding set of at least one policy event, at least one policy condition, and at least one policy action includes:

determining the presence of one or more mandatory fields; and creating an error message if the one or more mandatory fields are not present.

15. The system according to claim 14, wherein the processor operates to:

determine the presence of at least one unknown data structure in the set of at least one policy event, at least one policy condition, and at least one policy action of a policy rule; and create an error message if an unknown structure is present.

16. The system according to claim 15, wherein the processor further operates to:

determine a presence of at least two continuum levels;

determine a mismatch of the at least two continuum levels; and create an error message.

* * * * *